Jan. 23, 1934.　　　J. F. RAYNOLDS　　　1,944,462
FLUID PRESSURE CONTROL APPARATUS FOR PRESSING MACHINES
Filed June 16, 1930　　3 Sheets-Sheet 1

INVENTOR
JOHN F. RAYNOLDS
BY
ATTORNEYS

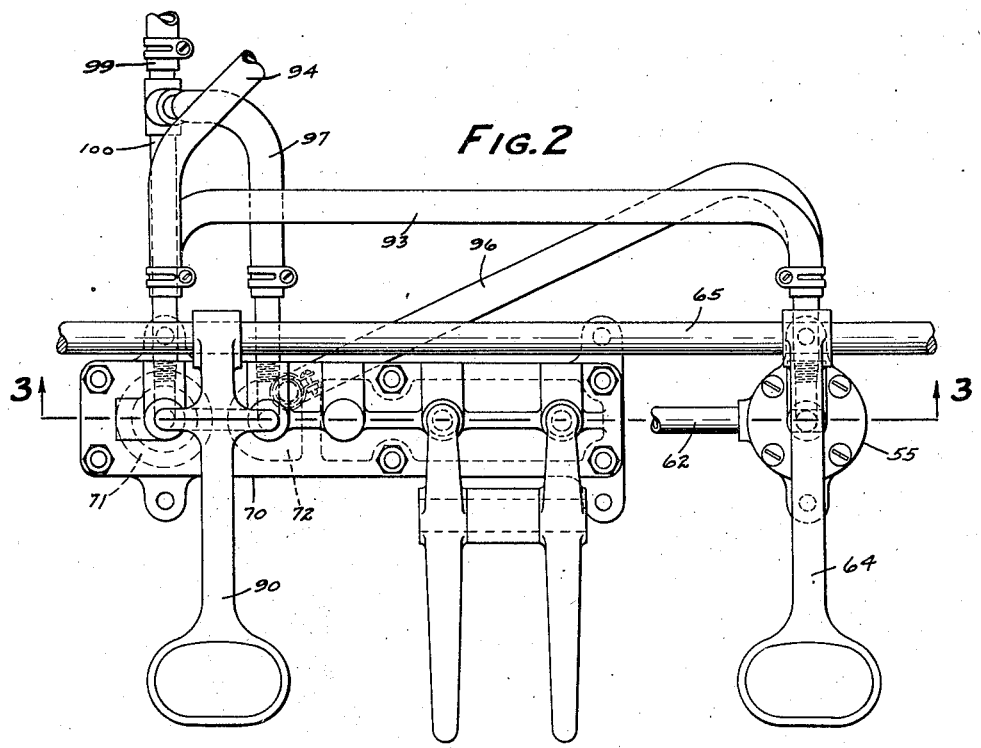
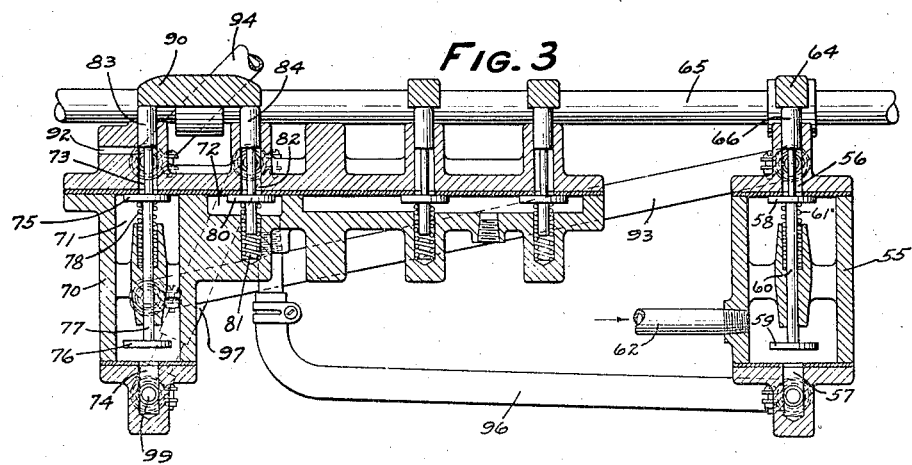

Jan. 23, 1934.　　　J. F. RAYNOLDS　　　1,944,462
FLUID PRESSURE CONTROL APPARATUS FOR PRESSING MACHINES
Filed June 16, 1930　　3 Sheets-Sheet 3
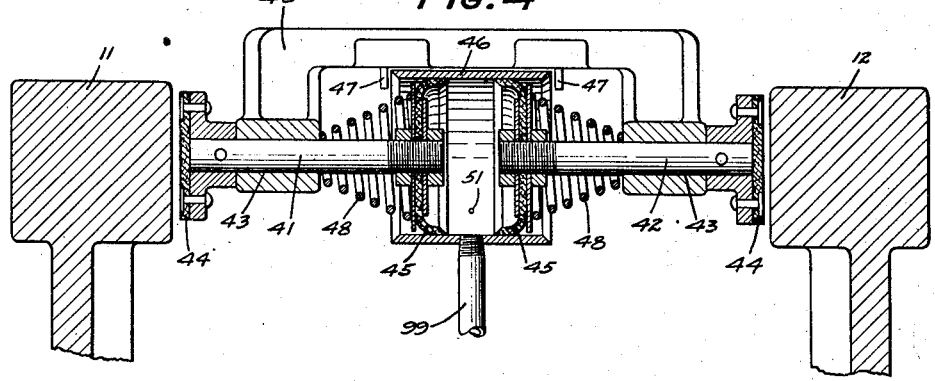
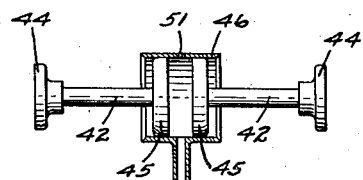
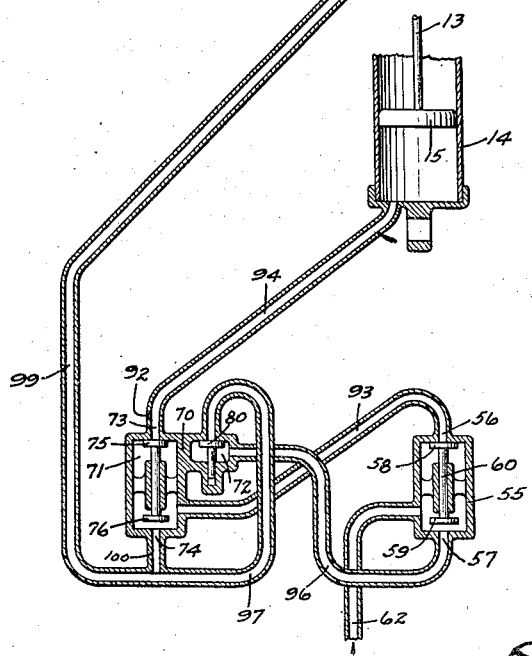
INVENTOR
JOHN F. RAYNOLDS
BY
ATTORNEYS Patented Jan. 23, 1934

1,944,462

UNITED STATES PATENT OFFICE 1,944,462

FLUID PRESSURE CONTROL APPARATUS FOR PRESSING MACHINES

John F. Raynolds, Minneapolis, Minn., assignor to The Unipress Company, Incorporated, Minneapolis, Minn., a corporation of Minnesota Application June 16, 1930. Serial No. 461,394

14 Claims. (Cl. 192—131)

This invention relates generally to the control of flow in fluid pressure systems, and an important object is to provide means by the use of which pressure can be controlled to each of two branch pipes leading from a pressure supply pipe, in such manner that the pressure can only be applied in one branch pipe when two valve-controlling elements are held in a predetermined position and whereby when either valve control element is released (after initial motion to the predetermined position) pressure to one line is automatically cut off and is applied to the other line. The invention finds valuable application in power presses and particularly in garment presses, the object being, in this particular application of the invention, to make it necessary for the operator to use both hands to obtain a power operation of the press, and until the pressing head has reached closed position, with the arrangement such that if, during the forward motion of the pressing head, either hand is removed from its control, further forward motion of the head is prevented, whereby it is impossible for the operator to be injured by placing either hand under the pressing head during its forward motion.

Features of the invention not only include the fluid-pressure system and its control per se, but its application to presses in general, and to garment presses in particular, along with all details of construction.

Features and advantages of the invention will be set forth in the description of the drawings forming a part of this application, and in said drawings:

Figure 2 is a detail plan view of a portion of the valved system and manually operable elements for controlling it;

Figure 3 is a longitudinal section substantially on line 3—3 of Figure 2;

Figure 4 is a section through the fluid-operable brake mechanism, substantially on line 4—4 of Figure 1; and Figure 5 is a schematic view illustrating the pneumatic control system as applied to two fluid-operable control mechanisms.

Figure 1:
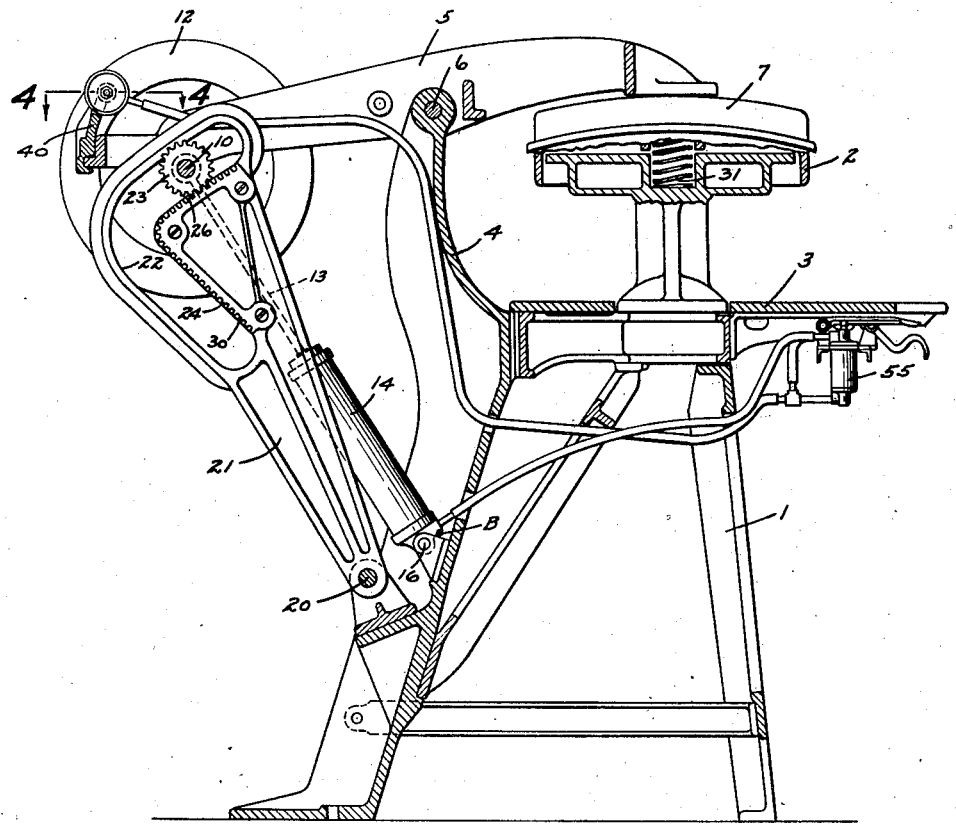
Figure 1 is a vertical section through a garment press showing the invention embodied therein.

The present invention has found valuable application in a garment press substantially of the type disclosed in Patent No. 1,562,837, the principal difference being that the present device is controlled by fluid-operable means. The illustration of the drawings has been directed to that type of press, but it will be understood that there is no intention to limit the invention, which invention includes the broad feature of a fluid control system having the characteristics described below.

Referring first to Figure 1: Number 1 generally designates a frame structure upon which the buck 2 is mounted in a well known manner, to support the goods to be pressed. The table is indicated at 3 and a portion of frame 4 extends above it. At the upper end of this portion 4, the pressing arm 5 is pivoted as at 6. The pressing arm has at one end a pressing head 7 engageable with the buck 2, and at the opposite end has journaled therein upon a horizontally arranged shaft 10, a flywheel structure comprising two flywheel sections 11—12 (see Figure 4) spaced apart, which is keyed to the shaft by means not shown in the drawings. Means is provided for imparting a rotative motion to the flywheel when the arm 5 is rocked. Some of the details of construction of this means are described in the application of F. W. Lindemann for Garment presses, Serial Number 318,170, but are not entered into here because these particular details form no part of the present invention, only a sufficient number of parts being shown and described as are needed to disclose an operative structure herein. For this purpose, a piston rod 13 is connected at one end to the shaft 10, and has a piston 15, operating in a cylinder, and constituting one form of fluid-operable device, see Figures 1 and 5. This piston is pivoted as at 16 to the rear of the frame 1. By means of air introduced into the cylinder 14, movement of the arm in pressing direction is given. A linkage is provided between the wheel and the frame, by which rotation is imparted to the flywheel as the result of power applied through cylinder 14. This motion may be given by grasping the head 7 and pulling it downwardly, but the present invention relates to a compressed air device for giving the flywheel initial momentum, along with means for stopping flywheel rotation and forward motion of the head under certain conditions.

Pivoted at its lower end to the frame 1, as at 20, is a link or frame 21, adapted to rock toward and away from the frame. The link is disposed rearwardly of the pivot 6 which secures the arm 5 to the frame, and the pivot 20 lies below the pivot 6. The element 21 is provided with a guide slot 22 having angularly related portions. Keyed upon the shaft 10 is a gear wheel 23 meshing with teeth 24 arranged on one wall of the slot. Thus a slidably guided and positively geared connection between the flywheel and the link 21 is obtained. When the arm is moved, rotative movement is imparted to the flywheel. In normal operation, initial impetus is given to the flywheel when the head 7 is in retracted position (not shown), and when the link 21 is nearer to frame 1, and gear 23 is in the lower leg of the slot 22. The portion 26 of the rack is curved on an arc the center B of which lies to the right of the pivotal means 20. With this arrangement, and with the head 7 retracted from the buck, and the gear wheel 23 engaging the rack portion 30, and when impetus is given to the wheel 12 through the action of air in the cylinder 14, the link moves outwardly to the position shown in Figure 1, and the gear rides upwardly on the rack portion 30, and then along the rack portion 26. Due to the eccentricity of this rack portion 26, a wedging action is gradually applied to the rocker arm, as the head nears the work. The buck is depressed against the action of the relatively powerful springs 31. When the press is released in a manner below described, the springs 31 act to give impetus to the arm, and cause rotation of the wheel 12 in counter-clockwise direction to rock the arm to the original initial or open position with the gear 26 again engaging the rack portion 30, and with the link 21 lying at a position to the right of that shown in Figure 1.

A claimed feature of the invention is the fluid-operable brake structure best shown in Figure 4. This structure is mounted at the rear end of the arm 5 upon a bracket 40 and includes two piston stems 41—42 slidable in suitable bearings 43 of the bracket 40. Each stem has at one terminal a brake shoe 44 and at the opposite terminal a piston 45 slidable in cylinder 46. This cylinder is floatingly supported by the pistons and is held against movement in an axial direction by pins 47. Interposed between the outer side of each piston and the corresponding bearing 43 is a spring 48, which draws the shoes against the bearings 43 as stops, leaving the piston heads spaced apart as shown. A fluid supply pipe is indicated at 99 and delivers between the pistons. A vent or "bleeder" opening is shown at 51 and is also located between the pistons. During application of pressure, the vent in no way interferes with the proper operation, but functions to vent the air after pressure release, to withdraw the brakes. It is evident that when fluid is introduced between the pistons under sufficient pressure, the piston and related parts are moved to braking position. When the pressure is released, exhaust of the air takes place through 51, and the pistons are moved by the springs to occupy the position shown in Figure 4.

A very important feature of this invention is the provision of a mechanism for controlling a compressed fluid for operation of the pistons 15 and 45. These cylinder piston structures being one fluid-operable means for accomplishing the result. One object is to require the employment of both hands of the operator during forward motion of the head 7 towards the buck to prevent accidents due to an attempt on the part of the operator to smooth out wrinkles in the goods after the head has begun its downward movement. To this end, a device is employed which includes lever-operated valves, and two levers for operating them, one to be operated by each hand.

Before describing the structure in which the present fluid-power-control is embodied, it may be briefly said that the arrangement, as applied to a press, includes fluid-operable head-controlling means, fluid-operable brake-controlling means, and a valve-controlled pressure system and means associated therewith and adapted for controlling both head and brake fluid-operable-controlling means, including valves and two manually-movable elements initially operable for controlling said valves to operate the head, and, in which, if one of the manual means is moved from its initial position during forward motion of the head, pressure is cut off to the head-controlling mechanism and is applied to the brake-controlling mechanism to apply the brakes and prevent continued forward motion of the head. However, the pressure control per se is a feature of the invention and may be embodied in other ways. Briefly, this system per se includes a compressed-fluid supply line, first and second branch lines leading from the supply line at a common point, two valves in the first branch, two valves in the second branch, a third branch having one end connecting with the first branch between the valves, and the other connecting with the other branch beyond both valves in direction away from the common branching point, and having a valve therein, along with means for operating the valves so that if, after opening the two valves in the first branch, one of them is closed, pressure to the first branch is interrupted and applied to the second branch either directly and entirely therethrough, or through part of the first branch, through the third branch and through that part of the second branch which does not include its valves.

Referring to Figure 3: A casing 55 is secured beneath the table 3, see Figure 1, and this casing has valve-controlled passages 56—57 respectively controlled by valves 58—59 movable in unison by connection to the stem 60, suitably guided. One of these valves is always closed when the other is open, and vice versa. A coil spring 61 normally urges the valve 58 to seating position, and when this valve is closed, the valve 59 is open. Valve 58 is one of the valves which controls supply to cylinder 15, see Figure 5, and is one of two branch lines which lead from a common point in line 62, of which branch 96 is the other. Fluid-supply pipe 62 delivers into the valve chamber just described. The valves just described are operated by a vertically swingable lever 64 pivoted on a suitable bearing rod 65. The lever engages a pin 66 which, in turn, engages the disk-like valve 58. When the lever 64 is sufficiently depressed, the valve 58 is opened, and valve 59 closed, all against the tension of spring 61, so that when released, the valves automatically resume the position shown. Adjacent the casing or chamber 55 is a casing 70 providing non-communicating chambers respectively indicated 71—72. In the chamber 71 is a valve structure which is substantially a duplicate of the valve structure described and which controls passages 73—74 respectively by means of valves 75—76 connected to a common stem 77 suitably guided within the chamber 71. Spring 78 normally seats the valve 75, leaving the valve 76 open. Within the chamber 72 is suitably guided a valve 80 automatically held in closed position by spring 81 and controlling passage 82. The valves just described are respectively operated by pins 83—84 slidable in passages 73—82. A lever 90 fulcrumed on rod 65 is adapted to simultaneously open valves 75—80, and close valve 76. Pin 83, when moved by the lever to valve-opening position, closes an exhaust port or vent 92 which communicates with the passage 73 and with cylinder 14 through line 94, as part of one of the branches. Thus when valve 75 is closed to interrupt pressure to cylinder 14, port 92 is open to relieve residual pressure in that cylinder. A suitable conduit 93 connects passage 56 with chamber 71, and a suitable conduit 94 connects passage 73 (and therefore chamber 71) with power cylinder 14, see Figure 5. Conduit 96 connects passage 57 (and therefore chamber 55) with chamber 72. Passage 82 (and therefore chamber 72) is connected by conduit 97 with conduit 99, and a short conduit section 100 establishes communication between passage 74 and conduits 97 and 99. The relations of the conduits are most clearly shown in Figure 5. Chamber 55, conduit 93, chamber 71 and conduit 94 may be considered as forming a first branch from supply pipe 62; conduit 96, chamber 72, and conduits 97 and 99 may be considered as forming a second branch from supply pipe 62; and passage 74 and conduit 100 as forming a third valve-controlled branch cross-connecting the other two branches. Therefore, the above described embodiment includes two branches, each controlled by a pair of valves, and a third branch cross-connecting the other two, and controlled by a single valve; five valves in all, arranged in three branch lines.

Before explaining the operation, it is to be understood that the present device, not only provides means for controlling a press to prevent accidents due to insertion of the hand of the operator between the pressing elements as the movable element advances to pressing position, but also provides means whereby fluid pressure may be controlled to two fluid-operable motors in such a way that after one is made operative, it can be made inoperative and the other immediately made operative by the proper manipulation of the control means, and further that the two fluid-operable motors can be applied to the control of a single element to start operation of that element and to stop operation of the same element. The device, therefore, has uses other than as an emergency device, although the present description refers to that embodiment of the invention thus far found most valuable.

Operation

Referring to Figure 5: Let us suppose the three valves 58, 75 and 80, are opened by proper depression of the two levers, 64 and 90, valves 75—80 by one lever and valve 58 by the remaining lever, and that by this operation valves 59—76 are closed. Compressed air passes through the chamber 55 into pipe 93, into the chamber 71 and thence through pipe 94 to main cylinder 14. If the system is connected for operating a press of the type illustrated, the main cylinder will give impetus to the flywheel, causing it to move the pressing head 7 towards the buck 2. With both levers depressed, the valves 59—76 are closed and, therefore, no air is delivered to the brake cylinder, because pipe 96 cannot receive it. Valve 80 is, however, open. Now suppose that, during the forward motion of the head, the right hand control element only is released, and valve 58 closes and valve 59 opens. Immediately air pressure through valve 58 is interrupted and air passes through pipe 96 to chamber 72 past open valve 80 through lines 97 and 99 to the brake cylinder 46, thus applying the brake to stop rotation of flywheel elements 11, 12, and therefore, advance of the head toward the buck. On the other hand, suppose that the operator releases only the left hand control element. Valves 75—80 will close, 76 and 58 will be open, and 59 closed. Compressed air then passes from the supply 62 through chamber 55 and pipe 93 to chamber 71 and thence through lines 100, and 99 to the brake cylinder 46. It is, therefore, evident that upon release of either of the control elements 64—90 pressure supply to the main cylinder is interrupted, and is transferred to the brake cylinder. As before noted, the cylinder vent 92 is always opened when the pressure supply is cut off, and since the brake cylinder is supplied with a vent 51, residual air pressure is always exhausted at the proper time to release the brake or brakes. It is, of course, understood that the size of the vent 51 is not great enough to render the brake inoperative when full pressure is applied between the pistons as it is whenever either control 64—90 is released, during forward or power motion of the head. The system disclosed in Figure 5 can be applied in many ways, and although the specific embodiment is claimed, there is no intention to be limited only to that application of the inventive principle.

I claim as my invention:

1. A device of the class described including a movable member and fluid-operable means for controlling it, fluid-operable brake means for controlling said movable member, a valve-controlled pressure system and means associated therewith and adapted for controlling both of said fluid-operable means, including valves and two manually movable elements initially operable for controlling said valves to operate said movable member, and in which if one of said manual means is moved from its initial control position during motion of said movable member in one direction, pressure to the fluid-operable means controlling said member is cut off, and is applied to said brake control means to apply the brakes and prevent continued motion of said movable member, in the same direction.

2. A device of the class described including a pressing head, a work support against which this head can be engaged, fluid-operable means for controlling the head, fluid-operable brake means for controlling said head-controlling means, a valve-controlled pressure system and means associated therewith and adapted for controlling both of said fluid-operable means, including valves, and manually movable elements for controlling said valves, both of which elements must be initially moved to and manually held in one position, one by each hand of the operator, to supply fluid to said head-controlling means and move it to engage the work support, and in which if one of said manual means is not held in initial control position during forward motion of the head, pressure is cut off to said head control means, and applied to said brake control means to apply the brakes and prevent continued forward motion of the head.

3. A device of the class described including a pressing head, a work support against which this head can be engaged, fluid-operable means for controlling the head, fluid-operable brake means for controlling said head-controlling means, a valve-controlled pressure system and means associated therewith and adapted for controlling both of said fluid-operable means, including valves, and manually movable elements for controlling said valves, both of which elements must be initially moved to and manually held in one position, one by each hand of the operator, to supply fluid to said head-controlling means and move it to engage the work support, and in which if one of said manual means is not held in initial control position during forward motion of the head, pressure is cut off to said head control means, and applied to said brake control means to apply the brakes and prevent continued forward motion of the head, and vents for each fluid-operable controlling means adapted to relieve pressure therein and render said means inoperative, after the power operation has been properly performed.

4. A device of the class described including a pressing head, a work support against which this head can be engaged, fluid-operable means for controlling the head, fluid-operable brake means for controlling said head-controlling means, a valve-controlled pressure system and means associated therewith and adapted for controlling both of said fluid-operable means, including valves, and manually movable elements for controlling said valves, both of which elements must be initially moved to and manually held in one position, one by each hand of the operator, to supply fluid to said head-controlling means and move it to engage the work support, and in which if one of said manual means is not held in initial control position during forward motion of the head, pressure is cut off to said head control means, and applied to said brake control means to apply the brakes and prevent continued forward motion of the head, vents for each fluid-operable controlling means adapted to relieve pressure therein and render said means inoperative, after the power operation has been properly performed, and means adapted to automatically control the vent of said head control means to close it upon initial operation of the corresponding manually movable element.

5. In a pressing machine means to receive the material to be pressed, a head movable toward and away from said means, means for operating the pressing head including a rotatable element, a brake for said rotating element, fluid-operable devices respectively for controlling the brake and head-operating means and a fluid system and means therein for controlling said brake and head-operating means including a compressed fluid supply line, branch lines leading respectively to said head-operating and brake-operating means, and leading from a common point in the supply line, two valves in the head-operating branch line, two valves in the brake-operating line, a third branch line having one end connecting with the head branch line between the valves and the other end connecting with the brake branch line between the brake control mechanism, and that valve of the line nearest said brake control mechanism, a valve in the third branch, means connecting three of the valves one in each branch for movement in a manner to open the valves in the head and brake branch lines and close the valve in the third branch line and vice versa, and means for operating the remaining two valves respectively in the head and brake branch lines in a manner to open one when the other closes and vice versa.

6. A main cylinder and a brake cylinder, a compressed fluid supply line, main cylinder and brake cylinder branch lines leading from a common point in the supply line, two valves in the main cylinder branch, both of which must be open to connect the supply line with the main cylinder, two valves in the brake branch line, both of which must be open to connect supply with the brake cylinder, a third branch line having one end connecting with the main branch line between the valves, and the other end connecting with the brake branch line between the brake cylinder and that valve of the line nearest the brake cylinder, a valve in the third branch, means connecting three of the valves, one in each branch for movement in a manner to open the valves in the main and brake branch lines and simultaneously close the valve in the third branch line, and vice versa, and means for operating the remaining valves respectively in the main and brake branch lines in a manner to open one when the other closes and vice versa.

7. A device of the class described comprising a compressed fluid supply line, branch lines, first and second, leading therefrom at a common point, two valves in the first branch, two valves in the second branch, a third branch having one end connecting with the first branch between the valves, and the other end connecting with the other branch beyond both valves and having a valve therein, means for operating the valves so that if, after opening the two valves in the first branch, one of them is closed, pressure to the first branch is interrupted and applied to the second branch.

8. A device of the class described comprising a compressed fluid supply line, branch lines, first and second, leading therefrom at a common point, two valves in the first branch, two valves in the second branch, a third branch having one end connecting with the first branch between the valves, and the other end connecting with the other branch beyond both valves in direction away from the common branching point, and having a valve therein, means for operating three of the valves one in each branch for movement in a manner to open the valves in the first and second branch lines and close the valve in the third branch line and vice versa, and means for operating the remaining two valves respectively in the first and second branch lines in a manner to open one when the other closes and vice versa.

9. A pressure system, including a compressed fluid supply line, a main branch line and an auxiliary branch line leading from a common point in the supply line, two valves in the main branch line, two valves in the auxiliary branch line, a third branch line having one end connecting with the main branch line between the valves, and the other end connecting with the auxiliary branch line at a point beyond its valves in direction of fluid motion, a valve in the third branch, means connecting three of the valves one in each branch for movement in a manner to open the valves in the main and auxiliary branch lines and close the valve in the third branch line and vice versa, and means for operating the remaining two valves respectively in the main and auxiliary branch lines in a manner to open one when the other closes and vice versa.

10. In a pressing machine having a pressing head, a work support with which the head co-operates, fluid operable means for controlling the head including a rotatable member, fluid operable braking means for stopping the rotatable member, and pressure system for controlling both of said fluid operable means including a fluid pressure supply line, branch lines respectively leading to the fluid operable head-controlling means and to the fluid operable braking means, five valves and conduit connections therefor with said branch lines, two manually movable elements for controlling said valves, the said valves, control elements therefor, and conduit connections being so arranged that if, after both manually operable valve control elements have been so positioned as to operate the rotatable member for a head advancing motion, one of the manual control elements is moved from its initial control position, pressure to the fluid operable means controlling said member is cut off, and pressure is applied to said brake control means to apply the brakes and prevent continued motion of said pressing head in advance direction.

11. In a pressing machine having a pressing head, a work support with which the head cooperates, fluid operable means for controlling the head including a rotatable member, fluid operable braking means for stopping the rotable member, a fluid control system having conduit elements delivering to respective fluid operable means, a group of three valves in said system and means operable by one hand of an operator for operating them simultaneously, a group of two valves and means operable by the other hand of the operator for operating them simultaneously, the elements of the system being so arranged that when the valves are all initially operated to move them to a predetermined position to admit pressure to said head-advancing means, and if thereafter during the head-advancing period either group is moved from their initial position, pressure is automatically shunted to the fluid operable braking means, and the pressure to the fluid-operable head-controlling means shut off.

12. A device of the class described including first and second fluid operable means, a fluid control system having control elements delivering to respective pressure operable means, a group of three valves in the system and means for operating them simultaneously, a group of two valves and means for operating them simultaneously, the elements of the system being so arranged that when the valves are all initially operated to move them to a predetermined position to admit pressure to the first mentioned fluid operable means, and if thereafter during the pressure period either group is moved from their initial position, pressure is automatically shunted to the second fluid operable means, and pressure to the first fluid operable means shut-off.

13. A device of the class described including first and second pressure operable means, a fluid control system having control elements delivering to respective pressure operable means, a group of three valves in the system and means for operating them simultaneously, a group of two valves and means for operating them simultaneously, the elements of the system being so arranged that when the valves are all initially operated to move them to a predetermined position to admit pressure to the first mentioned fluid operable means, and if thereafter during the pressure period either group is moved from their initial position, pressure is automatically shunted to the second fluid operable means, and pressure vents for said pressure operable means and pressure to the first fluid-operable means shut off located beyond all valves in direction of said pressure operable means.

14. In a pressing machine having a presser head and a work support with which said head cooperates, means for operating the head including a flywheel under the momentum of which the head is brought to pressing position, fluid operable means for initiating motion of the flywheel, fluid operable means for stopping flywheel rotation, a fluid pressure control system having conduit elements delivering to respective fluid operable means, a pair of control members one for each hand of the operator, valve means controlled by each control member, said valve means and conduit elements of the system being so arranged that when the operating members move the valves to a predetermined position fluid is applied for giving momentum to the flywheel, and if during head advancing period either control member is moved from its initial position, pressure is applied to the fluid operable flywheel-rotation-stopping means.

JOHN F. RAYNOLDS.